United States Patent
Park et al.

(10) Patent No.: US 8,687,692 B2
(45) Date of Patent: Apr. 1, 2014

(54) METHOD OF PROCESSING A VIDEO SIGNAL

(75) Inventors: Seung Wook Park, Seoul (KR); Jung Sun Kim, Seoul (KR); Young Hee Choi, Seoul (KR); Byeong Moon Jeon, Seoul (KR); Joon Young Park, Seoul (KR)

(73) Assignee: LG Electronics Inc., Seoul (KR)

( * ) Notice: Subject to any disclaimer, the term of this patent is extended or adjusted under 35 U.S.C. 154(b) by 422 days.

(21) Appl. No.: 12/540,208

(22) Filed: Aug. 12, 2009

(65) Prior Publication Data

US 2010/0061454 A1 Mar. 11, 2010

Related U.S. Application Data

(60) Provisional application No. 61/088,333, filed on Aug. 12, 2008, provisional application No. 61/097,878, filed on Sep. 18, 2008, provisional application No. 61/111,325, filed on Nov. 4, 2008, provisional application No. 61/143,822, filed on Jan. 12, 2009, provisional application No. 61/184,834, filed on Jun. 7, 2009, provisional application No. 61/186,906, filed on Jun. 15, 2009.

(30) Foreign Application Priority Data

Aug. 12, 2009 (KR) .................. 10-2009-0074098

(51) Int. Cl.
*H04N 7/12* (2006.01)
*H04N 11/02* (2006.01)
*H04N 11/04* (2006.01)

(52) U.S. Cl.
USPC .............. 375/240.12; 375/240.01; 375/240.2; 375/240.16; 375/240.24

(58) Field of Classification Search
USPC ..................................... 375/240.12
See application file for complete search history.

(56) References Cited

U.S. PATENT DOCUMENTS 5,986,709 A * 11/1999 Lee ............................. 375/240.2
2003/0206582 A1* 11/2003 Srinivasan et al. ........ 375/240.01

(Continued)

FOREIGN PATENT DOCUMENTS

EP 1370087 B1 12/2008
KR 10-2001-0069018 A 7/2001

(Continued)

OTHER PUBLICATIONS

PCT International Search Report dated Dec. 21, 2010 for Application No. PCT/KR2010/003639, with English translation, 6 pages.

(Continued)

*Primary Examiner* — Christopher S Kelley
*Assistant Examiner* — Hee-Yong Kim
(74) *Attorney, Agent, or Firm* — Fish & Richardson P.C.

(57) ABSTRACT

A method of processing a video signal is disclosed. The present invention includes obtaining a DC (discrete cosine) transform coefficient for a current macroblock and partition information of a DC (direct current) component block from a bitstream, obtaining transform size information of each partition of the DC component block based on the partition information of the DC component block, performing an inverse DC transform or a Hadamard transform based on the transform size information of the partition of the DC component block, performing inverse quantization on a result value from the transform and an AC (alternating current) component, and reconstructing a residual block by performing an inverse DC transform on a result value from the inverse quantization, wherein the residual block includes a block indicating a pixel value difference between an original picture and a predicted picture.

4 Claims, 7 Drawing Sheets

(56) References Cited

U.S. PATENT DOCUMENTS

| | | |
|---|---|---|
| 2004/0114686 A1 | 6/2004 | Sugiyama et al. |
| 2004/0234144 A1 | 11/2004 | Sugimoto et al. |
| 2005/0249291 A1 | 11/2005 | Gordon et al. |
| 2007/0025631 A1 | 2/2007 | Kim et al. |
| 2007/0104268 A1 | 5/2007 | Seok et al. |
| 2007/0211953 A1 | 9/2007 | Sasagawa |
| 2010/0208827 A1* | 8/2010 | Divorra Escoda et al. .................. 375/240.24 |
| 2010/0246684 A1* | 9/2010 | Naito et al. ............. 375/240.16 |

FOREIGN PATENT DOCUMENTS

| | | |
|---|---|---|
| KR | 10-2002-0094823 A | 12/2002 |
| KR | 10-2006-0123939 A | 12/2006 |

OTHER PUBLICATIONS

Naito S et al: "Efficient Coding Scheme for Ssuper High Definition Video Based on Eextending H.264 High Profile" Proceedings of the SPIE—The International Society for Optical Engineering, vol. 6077, No. 67727, Jan. 18, 2006, pp. 1-8, XP002538136.

European Search Report dated May 6, 2010, for Application No. 09010399, 7 pages.

International Search Report dated Apr. 8, 2010 for Application No. PCT/KR2009/004498, 3 pages.

European Search Report dated Sep. 2, 2011 for Application No. 11005257, 7 pages.

Sridhar Srinivasan et al.; "Windows Media Video 9: Overview and Applications", Signal Processing. Image Communication, vol. 19, No. 9, Oct. 1, 2004, pp. 851-875, XP004607151, Elsevier Science Publishers, Amsterdam, NLISSN: 0923-5965, DOI:10.1016/J.IMAGE.2004.06.005.

Mathias Wien; "ABT Coding for Higher Resolution Video", ITU Study Group 16-Video Coding Experts Group—ISO/IEC MPEG & ITU-T VCEG (ISO/IEC JTC1/SC29/WG11 and ITU-T SG16 Q.6), XX, XX, No. JVT-B053, Feb. 1, 2002, XP030005053.

* cited by examiner

Obtained flag information - 0110

FIG. 5

| I8 x 8MB 0 | I8 x 8MB 1 |
|---|---|
| I4 x 4MB 2 | I8 x 8MB 3 |

Obtained flag information - 110

|   | First flag | Second flag | Transform size |
|---|---|---|---|
| 1 | 0 | 0 | 4 x 4 |
| 2 | 1 | 0 | 8 x 8 |
| 3 | 0 | 1 | 16 x 16 |

US 8,687,692 B2

METHOD OF PROCESSING A VIDEO SIGNAL

CROSS-REFERENCE TO RELATED APPLICATION

This application claims the benefit of U.S. Provisional Application No. 61/088,333 filed on Aug. 12, 2008, U.S. Provisional Application No. 61/097,878, filed on Sep. 18, 2008, U.S. Provisional Application No. 61/111,325, filed on Nov. 4, 2008, U.S. Provisional Application No. 61/143,822, filed on Jan. 12, 2009, U.S. Provisional Application No. 61/184,834 filed on Jun. 7, 2009, U.S. Provisional Application No. 61/186,906 filed on Jun. 15, 2009, Korean Application No. 10-2009-0074098 filed on Aug. 12, 2009, which are hereby incorporated by reference.

BACKGROUND OF THE INVENTION

1. Field of the Invention

The present invention relates to a method of processing a video signal, and more particularly, to an apparatus for intra- or inter-picture prediction and block unit encoding or decoding and method thereof.

2. Discussion of the Related Art

Generally, for eliminating temporal redundancy and spatial redundancy, intra- or inter-picture prediction is performed to increase a compression ratio of the video signal. And, such a technology as DC transform, vector quantization and the like is used.

SUMMARY OF THE INVENTION

Accordingly, the present invention is directed to a method of processing a video signal that substantially obviates one or more of the problems due to limitations and disadvantages of the related art.

An object of the present invention is to provide a method of processing a video signal, by which the video signal can be efficiently processed using intra-picture prediction.

Another object of the present invention is to provide a method of processing a video signal, by which the video signal can be efficiently processed using DC transform or Hadamard transform.

To achieve theses objects, the present invention proposes a method of processing a video signal, which is characterized in constructing a block including a DC (direct current) component by performing a DC transform on a macroblock larger than 16×16 and then performing a DC transform or a Hadamard transform on the constructed block.

To achieve theses objects, the present invention proposes a method of processing a video signal, which is characterized in using a DC transform having one of various transform sizes within one macroblock.

To achieve theses objects, the present invention proposes a method of processing a video signal, which is characterized in using flag information indicating a transform size of a DC transform having one of various transform sizes.

To achieve theses objects, the present invention proposes a method of processing a video signal, which is characterized in using prediction blocks differing from each other in size within a macroblock in case of intra-picture prediction is performed on the macroblock.

To achieve theses objects, the present invention proposes a method of processing a video signal, which is characterized in using flag information indicating a size of a prediction block to use the prediction blocks differing from each other in size within one macroblock.

Accordingly, the present invention provides the following effects or advantages.

First of all, the present invention is to eliminate spatial redundancy by performing DC transform or Hadamard transform. Therefore, coding of a video signal can be efficiently performed.

Secondly, the present invention is to efficiently compress data of a residual block by performing DC transform differing in transform size within one macroblock.

Thirdly, the present invention reduces size of transferred data using flag information indicating transform size, thereby enabling efficient video signal processing.

Fourthly, in case of a macroblock, the present invention enhances accuracy of prediction using various prediction block sizes within one macroblock in performing intra-picture prediction. Accordingly, since a data size is decreased by reducing residual data, the present invention enables efficient video signal processing.

BRIEF DESCRIPTION OF THE DRAWINGS

The accompanying drawings, which are included to provide a further understanding of the invention, are incorporated in and constitute a part of this specification, illustrate embodiments of the invention and together with the description serve to explain the principles of the invention.

In the drawings.

DETAILED DESCRIPTION OF THE INVENTION

Reference will now be made in detail to the preferred embodiments of the present invention, examples of which are illustrated in the accompanying drawings. First of all, terminologies or words used in this specification and claims are not construed as limited to the general or dictionary meanings and should be construed as the meanings and concepts matching the technical idea of the present invention based on to the principle that an inventor is able to appropriately define the concepts of the terminologies to describe the inventor's invention in best way. The embodiment disclosed in this disclosure and configurations shown in the accompanying drawings are just one preferred embodiment and do not represent all technical idea of the present invention. Therefore, it is understood that the present invention covers the modifications and variations of this invention provided they come within the scope of the appended claims and their equivalents at the timing point of filing this application.

First of all, a macroblock is explained as follows. A macroblock is a basic unit for processing a video frame and can be defined as a region constructed with 16×16 pixels. Yet, it is necessary to define a concept for a macroblock larger than 16×16 as a size of a video picture increases. A macroblock larger than 16×16 can become a basic unit for processing a video frame having resolution greater than that of the related art. For instance, this macroblock can be defined as a region constructed with 32×32 or 64×64 pixels.

A macroblock larger than 16×16 is adaptively usable according to resolution of a video picture. For instance, if resolution of a video picture is greater than VGA, it is able to define a size of a macroblock into 16×16. Accordingly, it is able to use a block having such a size as 16×8, 8×16, 4×8, 8×4 and 4×4 as a partition of the macroblock. If resolution is greater than VGA and smaller than 1,080 P, it is able to set a size of a macroblock to 32×32. Accordingly, it is able to use a block having such a size as 32×16, 16×32, 16×16, 16×8, 8×16 and 8×8. If resolution is greater than 1,080 P and smaller than 4 k×2 k, it is able to set a size of a macroblock to 64×64. And, it is able to use a block having such a size as 64×32, 32×64, 32×32, 32×16, 16×32 and 16×16. Yet, an encoder is able to determine a size of an optimal macroblock among a 16×16 macroblock and macroblocks larger than 16×16 according to resolution of a video picture. The determined size information of the macroblock can be transferred to a decoder on a slice level or a sequence level. Therefore, it is able to adaptively use the size of the macroblock.

A type of a macroblock according to expansion of a size of a macroblock is explained. First of all, according to a prediction mode of a macroblock, i.e., an intra-picture prediction mode or an inter-picture prediction mode, a type of a macroblock can be defined. This can include size information off a prediction block. And, a type of a macroblock for performing inter-picture prediction can include information on a prediction direction.

Particularly, a block coded in an intra-picture prediction mode can use such a block unit as 16×16 pixels, 8×8 pixels and 4×4 pixels. For a block coded in an inter-picture prediction mode, 16×16 pixels, 16×8 pixels, 8×16 pixels and 8×8 pixels are available for types of macroblocks. If the 8×8 pixels are available, 8×4 pixels, 4×8 pixels and 4×4 pixels are available for types of sub-macroblocks.

A type of a macroblock is defined in consideration of a size greater than 16×16 as follows. First of all, as a size of a video picture increases, a use frequency of a type of a relatively small macroblock will decrease. It is able to eliminate information on this type of the macroblock, whereby it is able to reduce the number of bits allocated to the corresponding type of the macroblock. For instance, if a resolution of a video picture is smaller than VGA, it is able to use the above explained type of the macroblock. Yet, if the resolution is greater than VGA and smaller than 1,080 P, a type of a macroblock smaller than 8×8 pixels may not be used. In particular, a block coded in an intra-picture prediction mode can use such a block unit as 16×16 pixels and 8×8 pixels. And, for a block coded in an inter-picture prediction mode, it is able to use such a type of a macroblock as 16×16 pixels, 16×8 pixels, 8×16 pixels and 8×8 pixels. In this case, a type of a sub-macroblock may not use 8×4 pixels, 4×8 pixels or 4×4 pixels. If a resolution is to grater than 1,080 P and smaller than 4 k×2 k, a type of a macroblock smaller than 16×16 pixels may not be used. In particular, for a lock coded in an intra-picture prediction mode or an inter-picture prediction mode, 16×16 pixels are usable as a type of a macroblock.

Likewise, an encoder is able to determine a type of an optimal macroblock according to resolution of a video picture. And, type information of the determined macroblock can be transferred to a decoder on a slice level or a sequence level. Accordingly, it is able to adaptively use a type of a macroblock.

Figure 1:
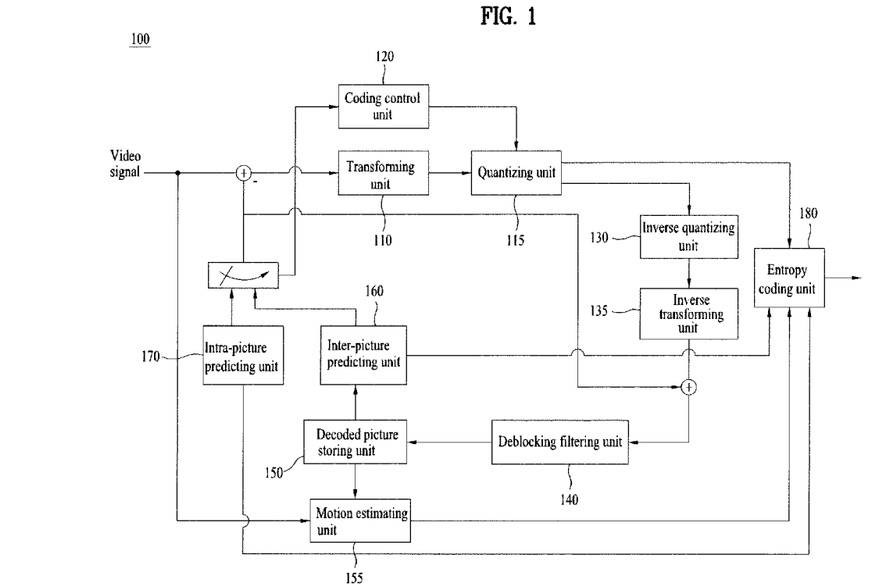
FIG. 1 is a schematic block diagram of a video signal encoding apparatus 100.

FIG. 1 is a schematic block diagram of a video signal encoding apparatus 100.

Referring to FIG. 1, a transforming unit 110, a quantizing unit 115, a coding control unit 120, a inverse quantizing unit 130, an inverse transforming unit 135, a deblocking filtering unit 140, a decoded picture storing unit 150, a motion estimating unit 155, an inter-picture predicting unit 160, an intra-picture predicting unit 170 and an entropy coding unit 180 are included.

The transforming unit 110 obtains a transform coefficient value by transforming a pixel value. In this case, a discrete cosine transform or a wavelet transform is usable. The quantizing unit 115 quantizes the transform coefficient value outputted from the transforming unit 110. The coding control unit 120 controls whether to perform intra-picture coding or inter-picture coding on a specific block or frame. The inverse quantizing unit 130 dequantizes the transform coefficient value and the inverse transforming unit 135 restores the dequantized transform coefficient value into an original pixel value. The deblocking filtering unit 140 is applied to each coded macroblock to reduce block distortion. A picture through deblocking filtering is stored in the decoded picture storing unit 150 to be used as a reference picture. The motion estimating unit 155 searches reference pictures for a reference block most similar to a current block using the reference picture stored in the decoded picture storing unit 150 and then delivers location information of the searched reference block and the like to the entropy coding unit 180. The inter-picture predicting unit 160 performs prediction of a current picture using the reference picture and then delivers inter-picture coding information to the entropy coding unit 180. The intra-picture predicting unit 170 performs intra-picture prediction from a decoded pixel within the current picture and then delivers intra-picture coding information to the entropy coding unit 180. The entropy coding unit 180 generates a video signal bitstream by coding the quantized transform coefficient, the inter-picture coding information, the intra-picture coding information, to the reference block information inputted from the motion estimating unit 160 and the like.

Figure 2:
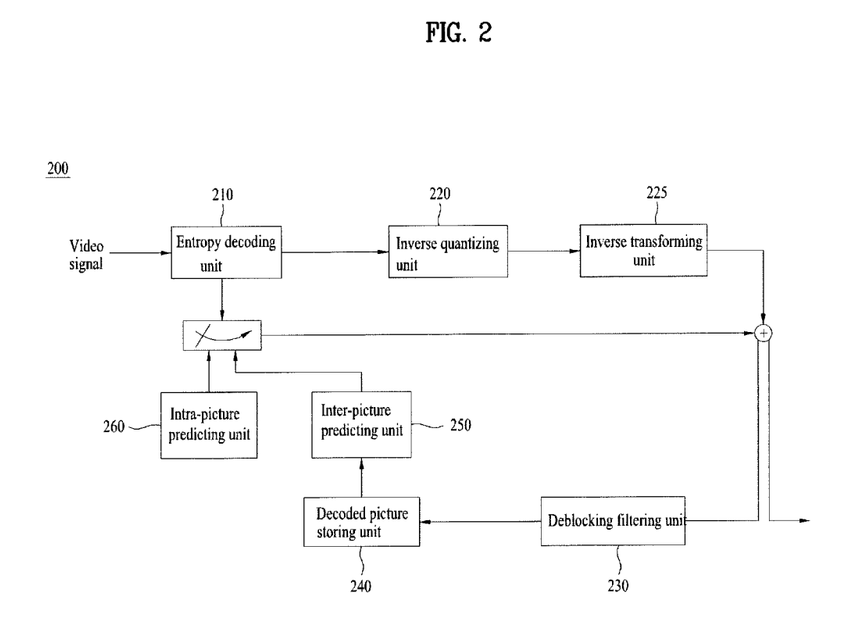
FIG. 2 is a schematic block diagram of a video signal decoding apparatus 200.

FIG. 2 is a schematic block diagram of a video signal decoding apparatus 200.

Referring to FIG. 2, a video signal decoding apparatus 200 according to the present invention includes an entropy decoding unit 210, a inverse quantizing unit 220, an inverse transforming unit 225, a deblocking filtering unit 230, a decoded picture storing unit 240, an inter-picture predicting unit 250 and an intra-picture predicting unit 260.

The entropy decoding unit 210 extracts a transform coefficient of each macroblock, a motion vector and the like by performing entropy decoding on a video signal bitstream. The inverse quantizing unit 220 dequantizes the entropy decoded transform coefficient and the inverse transforming unit 225 then restores an original pixel value using the dequantized transform coefficient. The deblocking filtering unit 230 is applied to each coded macroblock to reduce block distortion. A picture through filtering is stored in the decoded picture storing unit 240 to be outputted or used as a reference picture. The inter-picture predicting unit 250 predicts a current picture using the reference picture stored in the decoded picture storing unit 240 and inter-picture prediction information (e.g., reference picture index information, motion vector information, etc.) delivered from the entropy decoding unit 210. The intra-picture predicting unit 260 performs intra-picture prediction from a decoded pixel within the current picture. An original picture is then reconstructed by adding the predicted current picture and a residual outputted from the inverse transforming unit together.

An intra-picture prediction mode is explained in detail. As mentioned in the foregoing description, 4×4 pixels, 8×8 pixels and 16×16 pixels are usable as block units for performing intra-picture prediction in H.264/AVC. In this disclosure, intra-picture prediction of 4×4 or 16×16 pixel unit is explained as follows. First of all, with reference to a current 4×4 intra-picture prediction block, the 4×4 intra-picture prediction obtains a predicted value of the 4×4 pixels within a prediction block using four right pixels within a left block, four bottom pixels within an upper block, one right bottom pixel within a left upper block and one left bottom pixel within a right upper block. In this case, regarding an intra-picture prediction direction, a most suitable prediction direction is selected per 4×4 pixel block from 9 kinds of prediction directions in H.264/AVC and prediction is then performed by a block unit of 4×4 pixels based on the selected prediction direction. The 16×16 intra-picture prediction is performed by selecting one of the four kinds of methods including vertical prediction, horizontal prediction, average prediction and planar prediction from 16 bottom pixels of an upper macroblock and 16 right pixels of a left macroblock with reference to a current macroblock.

In case that a size of a macroblock is 32×32, a 32×32 intra-picture prediction method is explained as follows.

First of all, likewise, the 32×32 intra-picture prediction can be performed by selecting one of the four kinds of methods including vertical prediction, horizontal prediction, average prediction and planar prediction from 32 bottom pixels of an upper macroblock and 32 right pixels of a left macroblock with reference to a current macroblock. In the same manner of the 16×16 intra-picture prediction, the vertical prediction and the horizontal prediction are usable. And, the average prediction can be performed in the same manner using an average value of total 64 pixels including the 32 bottom pixels of the upper macroblock and the 32 right pixels of the left macroblock. The planar prediction is performed by interpolating a pixel of an upper macroblock and a pixel of a left macroblock in a diagonal direction.

In case that intra-picture prediction is performed on one macroblock, a method of obtaining size information of a prediction block is explained as follows. In this case, a size of a prediction block may mean a unit of block for performing inter-picture prediction or infra-picture prediction.

The size information of a prediction block can be obtained from type information of a macroblock. This will be named first prediction block size information. Yet, as a size of a macroblock increases, coding efficiency can be enhanced using sizes of different prediction blocks within one macroblock. For this, it is able to partition a macroblock into a plurality of partitions in a predetermined size. It is able to select a prediction block size suitable for each of the partitions. This will be named second prediction block size information. The selected second prediction block size information can indicate various prediction block sizes within one macroblock using a flag.

Figure 3:
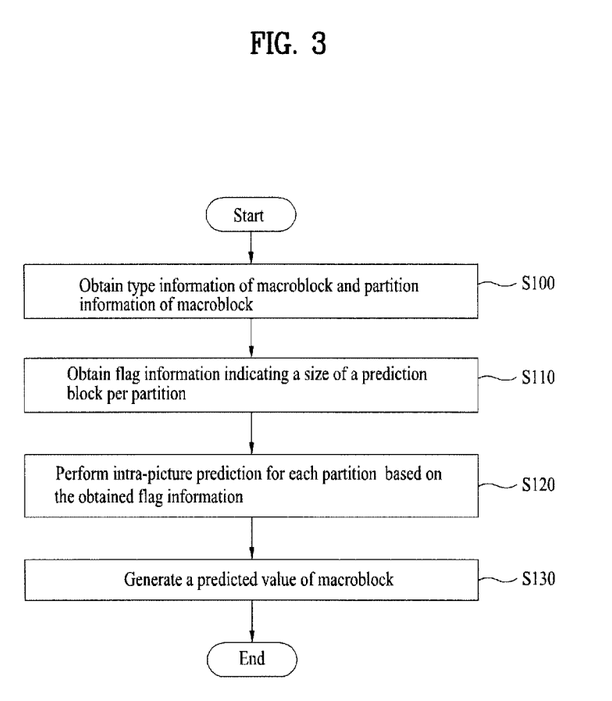
FIG. 3 is a block diagram for a process for obtaining size information of a prediction block for each partition within a macroblock in case of performing intra-picture prediction using sizes of various prediction blocks within one macroblock.

FIG. 3 is a block diagram for explaining a process for obtaining size information of a prediction block for each partition within a macroblock in a decoder.

Figure 4:
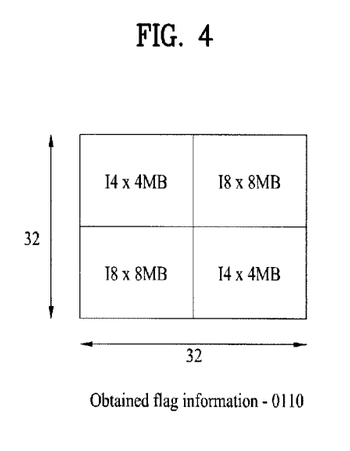
FIG. 4 and FIG. 5 are diagrams for a method of obtaining information of a size of a prediction block according to one embodiment of the present invention.

Referring to FIG. 3, an entropy decoding unit 210 is able to obtain type information of a macroblock and partition information of the macroblock from a received bitstream [S100]. An entropy decoding unit 210 is then able to obtain flag information indicating a size of a prediction block for each of the obtained partition [S110]. For instance, referring to FIG. 4, if a size of a macroblock is 32×32 and a first prediction block size obtained from type information of a macroblock is 4×4, a case of dividing a macroblock into four partitions is taken into consideration. If a second prediction block size of a partition within a macroblock is 4×4, as shown in FIG. 4, it is equal to the first prediction block size. Hence, it is able to set a flag indicating a size of a prediction block to 0. In case of 8×8, it is able to set the flag to 1. Therefore, it is able to sequentially obtain '0110' as the flag information indicating the second prediction block size for each of the partitions.

Meanwhile, prior to obtaining the flag information indicating the second prediction block size of each partition, it is able to obtain flag information indicating whether the second prediction block sizes of the partitions are equal to each other. If the second prediction block sizes of the partitions are equal to each other, '0' will be obtained as the flag information. Therefore, the flag information indicating the second prediction block size may not be obtained or the intra-picture prediction can be performed for each partition using the first prediction block size obtained from the type information of the macroblock. On the contrary, if any one of the partitions is different, '1' can be obtained as the flag information. In this case, as mentioned in the foregoing description, it is able to obtain the flag information indicating the second prediction block size. Yet, '1' is obtained as the flag information indicating whether the second prediction block sizes of the partitions are equal to each other. If all the flag information indicating the second prediction block size before the last partition is '0' or '1', the flag information indicating the second prediction block size of the last partition can be derived to '1' or '0'.

For another example, it is able to indicate a second prediction block size based on flag information indicating whether second prediction block sizes of partitions are equal to each other and location information of a partition having a second prediction block size different from a first prediction block size.

Figure 5:
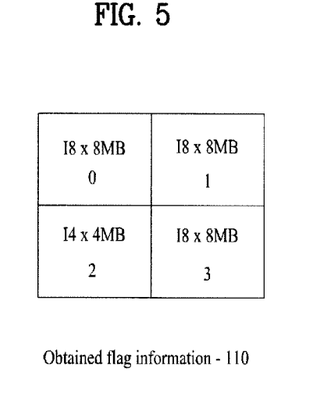

Referring to FIG. 5, if a first prediction block size is 8×8, a case of indicating location information of a partition is indicated as 0~3 is explained as follows. First of all, since a partition having location information set to 2 has a size of a 4×4 prediction block unlike a second prediction block size, it is able to obtain '1' as flag information indicating whether second prediction block sizes of all partitions are equal to each other. Since the location information of the partition having the 4×4 prediction block size is 2, this can be binarized into '10 '. Hence, it is able to obtain '110' as the flag information indicating the second prediction block size. In this case, intra-picture prediction can be performed on a partition having an 8×8 prediction block size using the first prediction block size information in an intra-picture predicting unit 260. Thus, it is able to perform the intra-picture prediction on each of the partitions based on the flag information indicating the obtained or derived second prediction block size [S120]. Therefore, it is able to generate the predicted value of the macroblock [S130]. DC (discrete cosine) transform, which is one of the video signal compression schemes, is explained.

First of all, the DC transform is the transform used to express an original video signal as a frequency component. It is able to completely restore an original pixel value by inversely transforming a value of the frequency component obtained by the DC transform, i.e., by performing inverse DC transform.

A result value by the DC transform is called a DC transform coefficient. The DC transform coefficient includes a DC (direct current) component and an AC (alternating current) component. The DC component is a coefficient having a frequency set to 0. And, a component except the DC component is the AC component having frequency variations ranging from a low frequency to a high frequency. Since a natural video smoothly varies, there is little variation and a high frequency component is not included. Therefore, by eliminating an AC coefficient corresponding to a high frequency component from an AC component, it is able to compress information.

A method of inducing a DC transform canal is explained. First of all, in case of a square type DC transform kernel, i.e., a N×N DC transform kernel, it can be derived from Formula 1.

$$T_{2N \times 2N}(i,j) = \{T_{N \times N}(i/2, j) \ j < N$$

$$\{T_{N \times N}(i/2, 2N-j-1) \ j >= N, \ i\%2=0$$

$$\{-T_{N \times N}(i/2, 2N-j-1) \ j >= N, \ i\%2=1 \quad \text{[Formula 1]}$$

In case that a size of a residual block according to intra- or inter-picture prediction is rectangular, i.e., M×N, a method of performing M×N DC transform is explained as follows. First of all, if a current macroblock is a M×N partition as a result of parsing a type of a macroblock, it is able to obtain M×N residual data $D_{M \times N}$ by parsing data of a residual block. It is able to obtain an intermediate value $E_{M \times N}$ by performing a dot operation between the $D_{M \times N}$ and the M×M DC transform kernel. It is able to restore M×N residual data using the result value from performing the dot operation between the $E_{M \times N}$ and the N×N DC transform kernel and a variable $C_N$ determined according to a value N. It is then able to reconstruct a M×N video signal by adding a prediction value of a current block to the reconstructed M×N residual data $R_{M \times N}$. This can be represented as Formula 2.

$$E_{M \times N} = (D_{M \times N} \cdot T_M + 4) >> 3$$

$$R_{M \times N} = (T_N' \cdot E_{M \times N} + C_N 1_M + 64) >> 7 \quad \text{[Formula 2]}$$

$C_4 = (0000)$, $C_8 = (00001111)$, $C_{16} = (0000000011111111)$

A process for performing DC transform on a residual block is explained in detail.

The residual block can mean the block that indicates a pixel value difference between a video predicted through intra- or inter-picture prediction and an original video. If a residual block is 16×16, it can be divided into 4×4 pixel blocks. And, 4×4 DC transform can be performed on each of the 4×4 pixel blocks. Subsequently, quantization is performed on a result value from the DC transform, i.e., a DC coefficient and an AC coefficient.

A DC component block of 4×4 pixels is constructed by gathering DC components of the 4×4 pixel blocks and 4×4 DC transform is then performed on the constructed 4×4 DC component block. Alternatively, 4×4 Hadamard transform, which is one of other orthogonal transform schemes, can be performed on the constructed 4×4 DC component block. A result value from performing the 4×4 DC transform or the 4×4 Hadamard transform and the AC coefficient are entropy encoded and then can be transferred to a decoder. In viewpoint of the decoder, 4×4 inverse DC transform or 4×4 inverse Hadamard transform is performed on the transferred result value from performing the 4×4 DC transform or the 4×4 Hadamard transform and inverse quantization and inverse DC transform will be sequentially performed on the corresponding result value and the transferred AC coefficient.

A case of a macroblock having a size greater than 16×16 is explained.

First of all, in case of a macroblock larger than 16×16, it is able to perform DC transform using a 16×16 small transform size. For instance, referring to FIG. 6, in case that a size of a macroblock is 32×32, it is able to perform 4×4 DC transform. It is a matter of course that 8×8 DC transform or 16×16 DC transform can be performed as well. After the DC transform has been performed, it is able to perform quantization on a DC transform coefficient that is a result of the DC transform. And, it is able to construct a DC component block by gathering DC components only. In this case, the DC component block can be constructed in a manner of being partitioned into four 4×4 pixel blocks or can be constructed with one 8×8 pixel block. A scheme for partitioning the DC component block can be selected in consideration of efficiency of compression. And, it is able to perform DC transform on the DC component block using information on the partition of the selected DC component block.

Figure 6:
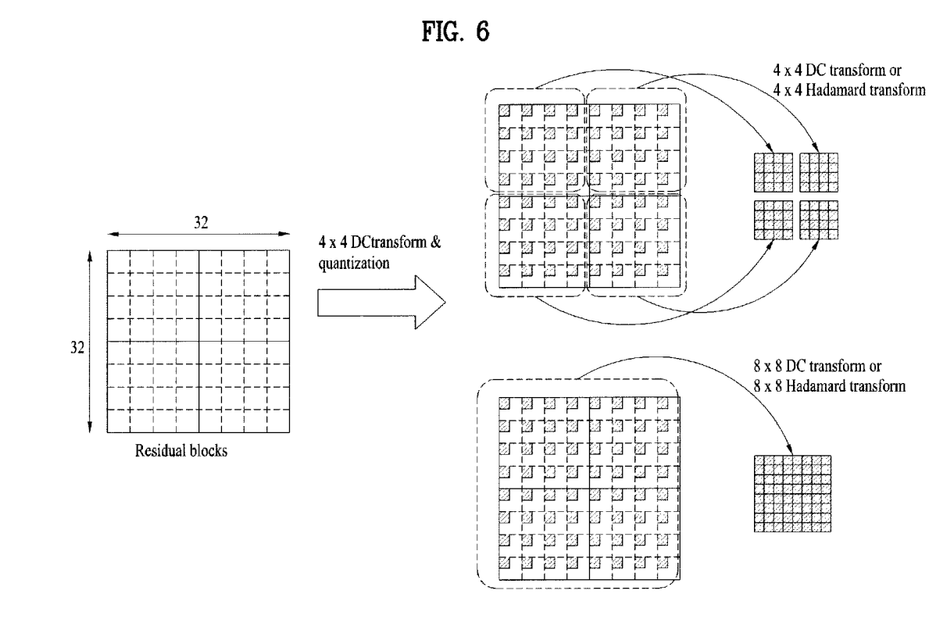
FIG. 6 is a diagram for a method of performing DC transform or Hadamard transform on a residual block according to one embodiment of the present invention.

First of all, a entropy decoding unit 210 is able to obtain information on a partition of a DC component block from a bitstream. In this case, the information on the partition can include information indicating whether DC transform was performed by partitioning the DC component block, size and number information of the partitioned block, location information of each of the partitioned blocks, and the like. A entropy decoding unit 210 is then able to obtain transform size information on each of the partitions based on information on the partitions within the DC component block. The information on the partitions within the DC component block can be derived through the DC transform size information used in performing the DC transform.

For instance, in case that 4×4 DC transform is used in performing the DC transform on the DC component block, it is able to recognize that the corresponding DC component block is constructed in a manner of being partitioned into four 4×4 pixel blocks. Therefore, the information on the partitions within the DC component block can be derived.

Based on the obtained or derived transform size information, it is able to perform inverse DC transform or inverse Hadamard transform on the partitions of the DC component block. An inverse quantizing unit 220 and an inverse transforming unit 225 are then able to perform inverse quantization and inverse DC transform on a result value from performing the DC transform or the Hadamard transform and an AC coefficient received via the bitstream. Therefore, it is able to obtain a reconstructed residual block.

In performing a transform (DC transform, Hadamard transform, etc.) on one macroblock, it is able to perform a DC transform having a single transform size. In particular, when a DC transform is performed on a 16×16 macroblock, it is able to use either 8×8 DC transform or 4×4 DC transform only. Yet, as a size of a macroblock increases, it is necessary to use a DC transform having a size greater than 8×8. It is able to enhance efficiency of coding if a DC transform having one of various transform sizes within one macroblock is adaptively used. In the following description, explained is a method of using various transform sizes within one macroblock.

Figure 7:
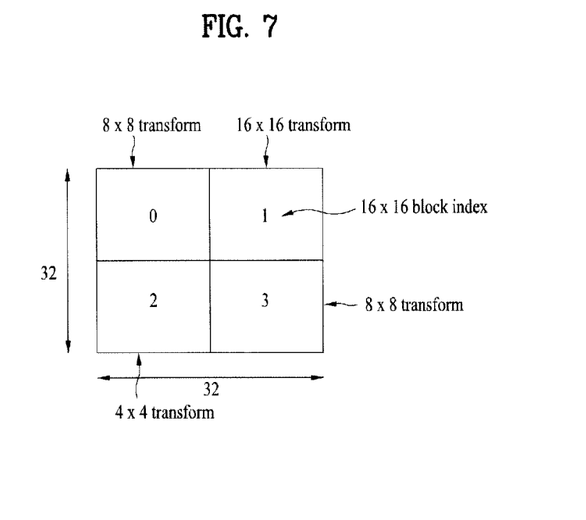
FIG. 7 is a diagram for a method of partitioning a macroblock into blocks uniform in size and then performing a DC transform having a different transform size on each of the partitions.

FIG. 7 is a diagram for a method of partitioning a macroblock into blocks uniform in size and then performing a DC transform having a different transform size on each of the partitions.

First of all, it is able to obtain information on partitions of a macroblock from a bitstream in the entropy decoding unit 210. The to partitions of the macroblock can include a region generated from partitioning the macroblock into blocks uniform in size. And, the information on the partitions can include size information of the partitions, information on the number of the partitions, location information of the partitions, and the like. It is able to obtain transform size information on each of the partitions based on the partition information of the macroblock in the entropy decoding unit 210. referring to FIG. 7, assume a case that a macroblock is larger than 16×16. It is able to set the macroblock to be partitioned by a 16×16 pixel block unit. After 4×4 DC transform, 8×8 DC transform or 16×16 DC transform has been performed on each of the 16×16 pixel blocks, it is able to select a transform size having a good compression ratio. Furthermore, in order to select the transform size in the above example, it is able to consider a size of a prediction block. As mentioned in the foregoing description, it is able to obtain the size of the prediction block from type information of the macroblock. For instance, as a result of parsing type information of the macroblock, if the 16×16 pixel block has a size of a prediction block smaller than the 16×16 pixel block, it is able use the 4×4 DC transform or the 8×8 DC transform for the 16×16 pixel block. And, a entropy decoding unit 210 is able to obtain the selected transform size information, location information of the 16×16 pixel block within the to macroblock and the like. A inverse quantizing unit 220 and a inverse transforming unit 225 are able to perform inverse quantization and inverse DC transform on each of the partitions according to the selected transform size information. Accordingly, it is able to obtain a reconstructed residual block.

Figure 8:
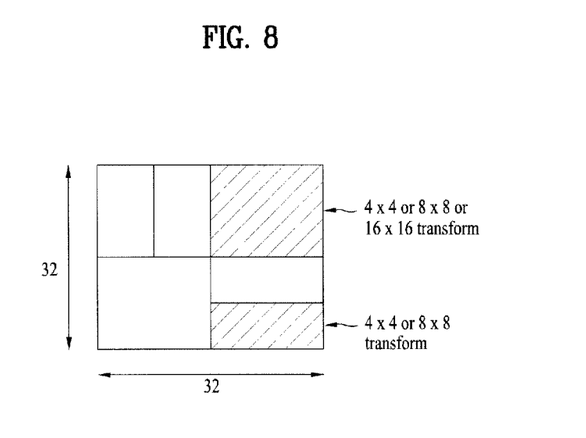
FIG. 8 is a diagram for a method of performing a DC transform differing in a transform size within a macroblock based on a type of the macroblock.

FIG. 8 is a diagram for a method of performing a DC transform differing in a transform size within a macroblock based on a type of the macroblock.

First of all, the entropy decoding unit 210 is able to obtain type information of a macroblock for a current macroblock. The entropy decoding unit 210 is then able to obtain transform size information based on size information of a prediction block according to the type information of the macroblock. In particular, it is able to selectively use 4×4 DC transform, 8×8 DC transform or 16×16 DC transform for each partition according to a size of a prediction block. Therefore, a decoder parses the type information of the macroblock and type information of a sub-macroblock and is then able to obtain transform size information on each of the partitions. For example, if a size of a prediction block is 16×16 as a result of parsing type information of a current macroblock and if a size of a prediction block is 16×8 as a result of parsing type information of a sub-macroblock, it is able to selectively use the 4×4 DC transform, the 8×8 DC transform or the 16×16 DC transform. Based on the transform size information, the inverse quantizing unit 220 and in the inverse transforming unit 225 are able to perform inverse quantization and inverse DC transform on each of the partitions. Accordingly, it is able to obtain a reconstructed residual block.

A method of transferring transform size information used for a residual block is explained. First of all, it is able to define a flag (first flag) indicating whether to use a 8×8 transform size. As a size of a macroblock increases, it is necessary to use a transform size greater than 8×8. Hence, it is able to define a flag (second flag) indicating whether to use a 16×16 transform size. Yet, it is a matter of course that a third flag and the like can be defined in the same manner. And, it is understood that the meaning of performing the 16×16 DC transform may indicate that a DC transform can be performed using a 16×8 transform size or an 8×16 transform size. In performing the 16×16 DC transform, whether to use a 16×16 transform size, a 16×8 transform size or an 8×16 transform size can be discriminated based on type information of a macroblock.

In particular, if three kinds of transform sizes including 4×4, 8×8 and 16×16 are usable, it is able to obtain information of a transform size to be used for a residual block by transferring two flags, i.e., a first flag to and a second flag.

Figure 9:
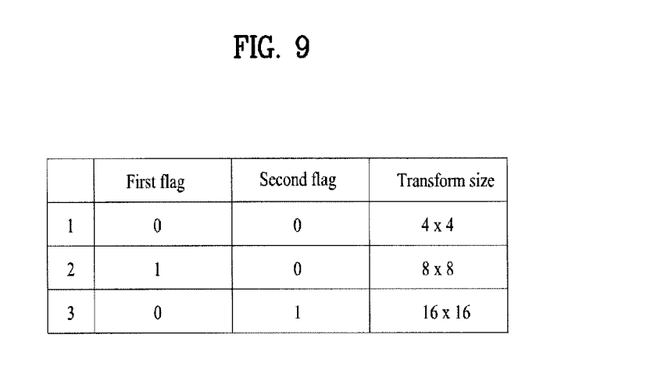
FIG. 9 is a table representing transform size used for a residual block according to the first flag and the second flag.

FIG. 9 is a table representing transform size used for a residual block according to the first flag and the second flag.

Referring to FIG. 9, if the first flag and the second flag are set to 0, 4×4 transform size can be used. If the first flag is set to 1 and the second flag is set to 0, 8×8 transform size can be used. If the first flag is set to 0 and the second flag is set to 1, 16×16 transform size can be used.

Meanwhile, it is able to transfer two flags hierarchically. For instance, after second flag information has been obtained, if the obtained second flag information is set to 1, a 16×16 transform size is usable. If the second flag information is set to 0, first flag information is obtained. If the obtained first flag information is set to 1, an 8×8 transform size is used. If the obtained first flag information is set to 0, a 4×4 transform size is usable. Meanwhile, it is a matter of course that the first flag information and the second flag information are available in reverse order.

For another instance, instead of transferring two flags both, one of the two flags is transferred to derive the other. Yet, this is suitable for a case that a usable transform size is limited according to a size of a residual block. For example, if a size of a residual block is 8×8, it is able to use a 4×4 transform size or an 8×8 transform size. Therefore, first flag information is transferred only but second flag information can be derived into 0. Meanwhile, it is able to set a transform size available according to a size of a residual block in advance. For example, in case that an 8×8 transform size is set not to be used for a 32×32 residual block, if first flag information is set to 0, a 4×4 transform size is used. If the first flag information is set to 1, a 16×16 transform size is usable. Therefore, a second flag can be derived into 1 without being transferred.

Accordingly, the present invention is applicable to video signal encoding/decoding.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

What is claimed is:

1. A method of decoding a video signal to enhance coding efficiency in a transform process, comprising:
obtaining a prediction partition mode of a current block;
deriving, at a decoder, transform partition information of the current block based on the prediction partition mode, wherein an M×N transform partition is derived when the prediction partition mode of the current block indicates that a prediction partition of the current block is a P×Q prediction partition, and wherein an N×N transform partition is derived when the prediction partition mode of the current block indicates that the prediction partition of the current block is a P×P prediction partition;
reconstructing residual data for the current block by performing an inverse transform based on the derived transform partition information;
obtaining a prediction value of the current block based on the prediction partition mode; and reconstructing a pixel value of the current block based on the reconstructed residual data and the prediction value of the current block, wherein the residual data is a pixel value difference between the reconstructed pixel value and the obtained prediction value, wherein M is greater than N, and M and N are each a natural number, and wherein P is greater than Q, and P and Q are each a natural number.

2. The method of claim 1, wherein the prediction block indicates a unit of block for performing picture prediction.

3. The method of claim 1, wherein the prediction value of the current block is obtained by performing inter-picture prediction.

4. The method of claim 1, further comprising performing the inverse transform using M×N residual data, an intermediate value obtained by performing a dot operation between the M×N residual data and a M×N transform kernel, and a N×N transform kernel.

* * * * *